United States Patent [19]

Newman

[11] 4,282,509

[45] Aug. 4, 1981

[54] SINGLE BRAKE LIGHT SWITCH FOR DUAL BRAKE PEDALS

[75] Inventor: Richard A. Newman, West Burlington, Iowa

[73] Assignee: J. I. Case Company, Racine, Wis.

[21] Appl. No.: 99,055

[22] Filed: Nov. 30, 1979

[51] Int. Cl.$^3$ .......................... B60Q 1/44; H01H 3/14
[52] U.S. Cl. .................................. 340/69; 200/61.86; 200/61.89; 340/71
[58] Field of Search ................. 340/69, 71; 200/61.85, 200/61.86, 61.89, 153 C

[56] References Cited

U.S. PATENT DOCUMENTS

| | | | |
|---|---|---|---|
| 1,646,419 | 10/1927 | Peck | 200/61.89 |
| 2,219,518 | 10/1940 | Engle et al. | 340/71 X |
| 2,584,938 | 2/1952 | Sweeny et al. | 340/69 |
| 2,959,449 | 11/1960 | Lazich | 200/61.89 X |
| 3,219,775 | 11/1965 | Carpenter | 200/61.89 |
| 3,521,233 | 7/1970 | Takeshi Inoue | 340/71 |
| 4,192,399 | 3/1980 | Otteson et al. | 200/61.86 X |

FOREIGN PATENT DOCUMENTS

| | | | |
|---|---|---|---|
| 25603 | 3/1930 | Australia | 200/61.89 |
| 698437 | 12/1931 | France | 200/61.89 |

*Primary Examiner*—John W. Caldwell, Sr.
*Assistant Examiner*—Joseph E. Nowicki

*Attorney, Agent, or Firm*—Cullen, Sloman, Cantor, Grauer, Scott & Rutherford

[57] ABSTRACT

A mechanism for actuating brake lights in response to the depression of either one or both of a pair of side-by-side brake pedals. The actuator mechanism includes a cylindrical control rod which is mounted to the pivotal brake pedal arms and extends along a transverse, horizontal axis in the space between them. The ends of the control rod pass through enlarged openings in the brake pedal arms, and the ends are retained thereto by retainer washers. The longitudinal axis of the control rod is normally perpendicular to the longitudinal axes of the brake pedal arms, but the enlarged openings in the arms permit the control rod to tilt for control purposes. A single electrical switch is supported adjacent to, but spaced from, the midpoint of the transverse control rod, and it includes an L-shaped actuator arm which engages and rides on the control rod at its midpoint. The electrical switch is opened when the pedals are in their normally raised position, thereby preventing the brake lights from being turned on unless one or both of the brake pedals are depressed. When either one of the brake pedals is depressed, the control rod becomes tilted downwardly which causes the switch actuator arm to move vertically downward, thereby closing the electrical switch and turning the brake lights on. In a like manner, depression of both pedals, simultaneously, causes the control rod to move vertically downward which also causes the switch to be closed.

2 Claims, 2 Drawing Figures

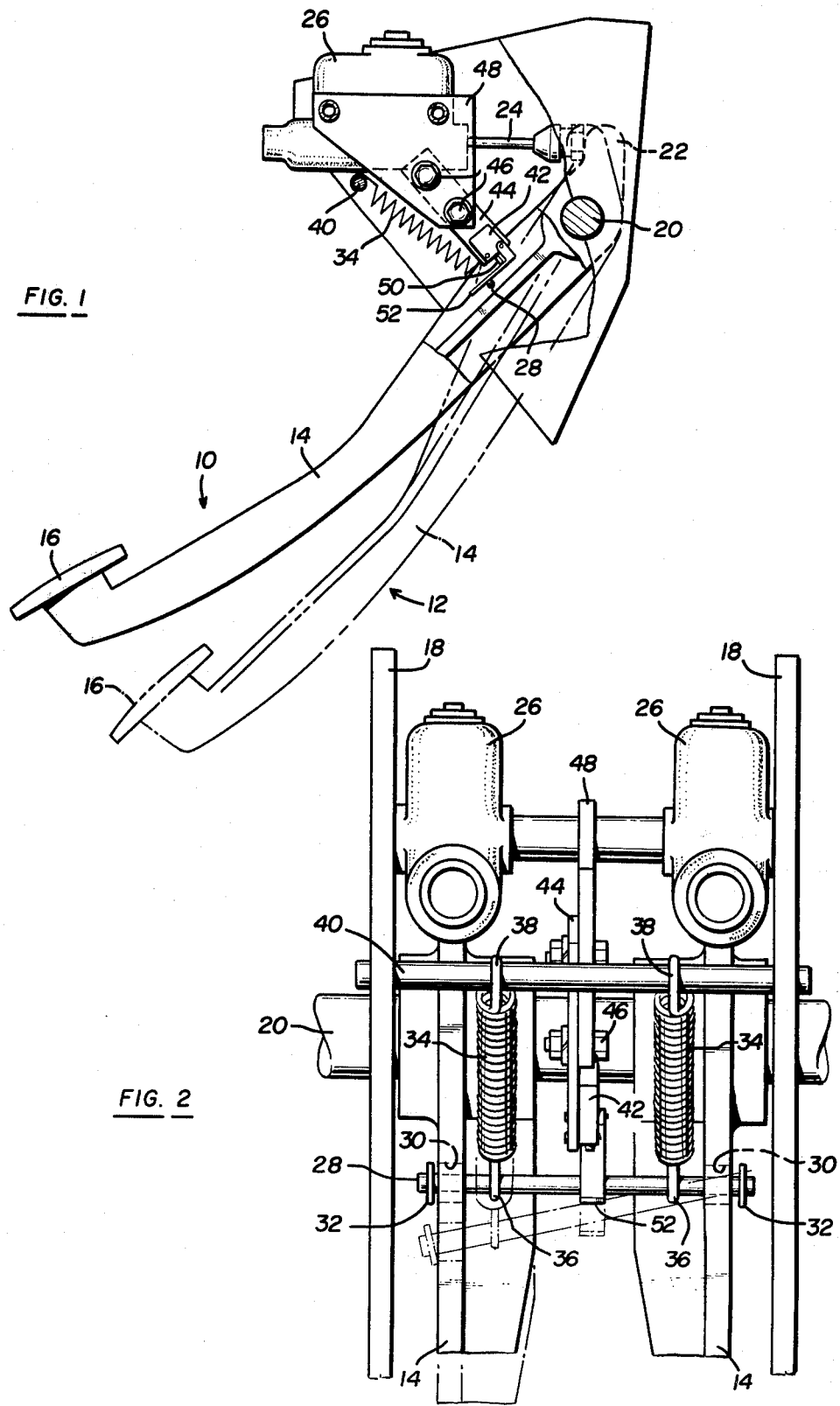

SINGLE BRAKE LIGHT SWITCH FOR DUAL BRAKE PEDALS

BACKGROUND OF THE INVENTION

The present invention relates to a means for actuating brake lights in response to the depression of a pair of side-by-side brake pedals, and more particularly, to a single electrical switch which is actuated when either one or both of the brake pedals are depressed.

It is conventional to provide a pair of brake pedals for tractors or similar machines, one for braking the left side of the machine and the other for braking the right side of the machine. The pedals may also be locked together to provide braking to both sides of the machine simultaneously. A problem exists in providing a mechanism for actuating brake lights when either one or both pedals are depressed without resorting to complicated and expensive structure and controls therefor.

The present invention provides a solution to the problem with a simple mechanism which closes a single electrical brake light switch in response to the depression of either or both brake pedals.

SUMMARY OF THE INVENTION

The present invention is intended for use on tractors or similar machines which use a pair of pivotal brake pedals for braking either the left side of the machine, the right side of the machine, or both sides of the machine simultaneously. The brake pedals of the present invention are side-by-side and include pivotal arms having foot pad surfaces on one end thereof which are closely spaced and aligned so that the operator, with one foot, can depress either or both pedals.

The actuator mechanism of the present invention includes a cylindrical control rod which is mounted to the pivotal brake pedal arms and extends along a transverse horizontal axis in the space between them. The ends of the control rod pass through enlarged openings in the arms and the ends are retained thereto by retainer washers. The longitudinal axis of the control rod is normally perpendicular to the longitudinal axes of the brake pedal arms, but the enlarged openings in the arms permit the control rod to be tilted for control purposes, as will be described.

A pair of coil springs, one for each brake pedal, are attached at one of their ends to the transverse control rod. The attachment point for each spring is slightly inward from each end of the control rod and adjacent to its respective brake pedal. The brake pedals are held in their normally raised or non-depressed position by the coil springs.

A single electrical switch is supported adjacent to, but spaced from, the midpoint of the transverse control rod, and it includes an L-shaped actuator arm which engages and rides on the control rod at its midpoint. The brake lights are actuated or turned on in response to the closing of the switch. The switch includes a spring-biased plunger which applies a downward force on the L-shaped actuator arm to keep it in contact with the transverse control rod at all times. The electrical switch is open when the pedals are in their normally raised position, thereby preventing the brake lights from being turned on unless one or both brake pedals are depressed.

When either one of the brake pedals is depressed, the control rod becomes tilted downwardly which causes the spring-biased actuator arm of the switch to move vertically downward, thereby closing the electrical switch and turning on the brake lights. In a like manner, depression of both pedals, simultaneously, causes the control rod to move vertically downward which also causes the switch to be closed. The ends of the control rod are movable within the enlarged openings of the pivotal brake pedal arms to accommodate the tilting of the control rod when only one of the brake pedals is depressed.

Other advantages and meritorious features of the actuator mechanism of the present invention will be more fully understood from the following description of the preferred embodiment, the appended claims, and the drawings, a brief description of which follows.

BRIEF DESCRIPTION OF DRAWINGS

FIG. 1 is a side elevational view of a pair of side-by-side brake pedals embodying the actuator mechanism for brake lights of the present invention and illustrating one of the brake pedals being depressed.

FIG. 2 is a front elevational view of the brake pedal assembly shown in FIG. 1 and illustrating the downward tilting of the control rod and closing of the electrical switch when one of the brake pedals is depressed.

DESCRIPTION OF THE PREFERRED EMBODIMENT

A preferred embodiment of a brake pedal assembly including the actuator mechanism made in accordance with the teachings of the present invention is illustrated in FIGS. 1–2.

The present invention is intended for use on tractors or similar machines which use a pair of pivotal brake pedals for braking either the left side of the machine, the right side of the machine, or both sides of the machine simultaneously. The brake pedals 10, 12 are side-by-side and include parallel pivotal arms 14 having foot pad surfaces 16 on one end thereof which are closely spaced and aligned so that the operator, with one foot, can depress either or both pedals. Each brake pedal arm 14 is pivotally attached to frame structure 18 by transverse horizontal pivot shaft 20. Embossments 22, formed on the brake pedal arms 14 at the ends opposite pedal surfaces 16, engage plungers 24 for actuating brake cylinders 26 which are mounted to the frame structure 18.

The actuator mechanism of the present invention includes a cylindrical control rod 28 which is mounted to the pivotal brake arms 14 and extends along a transverse, horizontal axis in the space between them. The ends of the control rod 28 pass through enlarged openings 30 in the brake arms 14, and the ends are retained thereto by retainer washers 32. The longitudinal axis of control rod 28 is normally perpendicular to the longitudinal axes of brake pedal arms 14, but the enlarged openings 32 in the arms permit the control rod 28 to tilt for control purposes, as will be described.

A pair of coil springs 34, one for each brake pedal, are attached at one of their ends 36 to the transverse control rod 28. The attachment point 36 for each spring 34 is slightly inward from the respective end of control rod 28 and adjacent to its respective brake pedal. The opposite ends 38 of coil springs 34 are attached to transverse shaft 40 which is mounted to frame structure 18. The brake pedals 10, 12 are held in their normally raised or nondepressed position by the coil springs 34.

A single electrical switch 42 is supported adjacent to, but spaced from, the midpoint of the transverse control rod 28. Switch 42 is secured to one end of support arm 44 which is adjustably mounted to support frame 48 by bolts 46. Switch 42 includes an L-shaped pivotal actuator arm 52 which engages and rides on control rod 28 at its midpoint. The brake lights (not shown) are actuated or turned on in response to the closing of switch 42. A spring-biased plunger 50 applies a constant downward force on the L-shaped actuator arm 52 to keep it in contact with transverse control rod 28 at all times. Electrical switch 42 is open when the brake pedals 10, 12 are in their normally raised position thereby preventing the brake lights from being turned on unless one or both brake pedals are depressed.

When either one of the brake pedals 10, 12 is depressed, control rod 28 becomes tilted downwardly as illustrated in phantom in FIG. 2 which causes the spring-biased actuator arm 52 to move vertically downward, thereby closing switch 42 and turning on the brake lights. In a like manner, depression of both pedals simultaneously causes the control rod 28 to move vertically downward which causes switch 42 to be closed. The ends of control rod 28 are movable within the enlarged openings 30 of pivotal brake pedal arms 14 to accommodate the tilting of the control rod when only one of the brake pedals is depressed.

It will be apparent to those skilled in the art that the foregoing disclosure is exemplary in nature rather than limiting, the invention being limited only by the appended claims.

I claim:

1. In a brake actuating assembly including a frame, a pair of brake arms pivotally secured to said frame, said brake arms being selectively depressed individually or jointly, the improvement comprising:

said brake arms being parallel and pivotally secured to said frame for vertical movement, each brake arm having a foot pad surface on one end thereof and an embossment at its opposite end for actuating a brake cylinder which is mounted to said frame;

a mechanism for actuating brake light means in response to the depression of either one or both of said brake arms, said mechanism for actuating brake light means including a control rod means, said control rod means being mounted to said pivotal brake arms, the longitudinal axis of said control rod means extending along a transverse axis in the space between said brake arms;

switch means supported on said frame adjacent to and spaced from said transversely mounted control rod means, said switch means including an actuator arm which engages said control rod means, said brake light means being actuated in response to the closing of said switch means, means for spring biasing said actuator arm to apply a continuous downward force on said actuator arm thereby keeping said actuator arm in contact with said transverse control rod means;

means for supporting said brake arms and control rod means in a normally raised position whereby the longitudinal axis of said control rod means extends along a first transverse horizontal axis which is substantially perpendicular to the longitudinal axes of said brake arms, said switch means being open when said brake arms are in their raised position, said control rod means being movable vertically downward upon simultaneous depression of both brake arms such that the axis of said control rod means assumes a second transverse horizontal position, said means for supporting said brake arms and control rod means including a pair of coil springs, one end of each coil spring being attached to said frame and the other end of each coil spring being attached to said control rod means adjacent a respective brake arm;

means for permitting said control rod means to be tilted downwardly from its first transverse horizontal position when either one of said brake arms is depressed, said means for permitting said control rod means to be tilted downwardly comprising enlarged openings in said brake arms, said control rod means including opposite ends which are mounted within said enlarged openings in said brake arms; and said actuator arm being spring biased vertically downward in response to the tilting of said control rod means when one of said brake arms is depressed or upon the movement of said control rod means to its second horizontal position when both brake arms are depressed simultaneously to thereby close said switch means for actuating said brake light means.

2. The brake actuating assembly as defined in claim 1 wherein said actuator arm is engageable with the midpoint of said control rod means.

* * * * *